United States Patent [19]

Beadle

[11] Patent Number: 5,706,898
[45] Date of Patent: Jan. 13, 1998

[54] EQUINE FROG SUPPORT SYSTEM

[75] Inventor: Ralph Eugene Beadle, Baton Rouge, La.

[73] Assignee: Board of Supervisors of Louisiana State University and Agricultural & Mech. College, Baton Rouge, La.

[21] Appl. No.: 440,537

[22] Filed: May 12, 1995

[51] Int. Cl.$^6$ ................................................ A01L 5/00
[52] U.S. Cl. ................................................ 168/28; 168/14
[58] Field of Search ................................ 168/14, 26, 27, 168/28, DIG. 1

[56] References Cited

U.S. PATENT DOCUMENTS

| | | | |
|---|---|---|---|
| 268,605 | 12/1882 | Bane | 168/28 |
| 3,630,289 | 12/1971 | Norberg. | |
| 4,899,824 | 2/1990 | Techer et al. | 168/28 X |
| 5,546,735 | 8/1996 | Brooks | 168/27 X |

FOREIGN PATENT DOCUMENTS

| | | | |
|---|---|---|---|
| 5440 | 12/1927 | Australia | 168/28 |

OTHER PUBLICATIONS

*Equine Medicine and Surgery*, 4th Edition, vol. II, pp. 1354–1367, E.M. Green, H.E. Garner, R.F. Sprouse, 1991.
*Equine Digital Support System*, 8th Annual Bluegrass Laminitis Symposium; paper presented by Gene Ovnicek on Feb. 21, 1994.

*Primary Examiner*—Robert P. Swiatek
*Attorney, Agent, or Firm*—John H. Runnels; Warner J. Delaune

[57] ABSTRACT

An equine frog support system, comprising a support base constructed of a material, preferably a thermoplastic material, molded to conform to the frog and collateral sulci of an equine foot, the material being sufficiently rigid and fully elastic during the use thereof to support the frog and the collateral sulci; and a wrapping or other device for holding the support base against the foot. Preferably, the support base is shaped to support only the frog and collateral sulci of the foot. Also, a method for treating equine laminitis is provided, comprising the steps of placing a softened hard-enable material, preferably a thermoplastic material, over the frog and collateral sulci of an equine foot. While the material is in a softened state, the animal is caused to place weight on the affected foot, thereby compressing the material between the ground and the foot. The compressed material is allowed to conform to the frog and the collateral sulci until the material hardens, thereby forming a substantially rigid and fully elastic support base, after which the support base is secured to the foot. If necessary, the support base may be removed from the foot after the material hardens, and excess material may be removed from the support base so that primarily the frog and the collateral sulci are supported.

6 Claims, 5 Drawing Sheets

5,706,898

EQUINE FROG SUPPORT SYSTEM

BACKGROUND OF THE INVENTION

I. Field of the Invention

This invention relates generally to devices and methods used in the treatment of equine laminitis, and more particularly to those devices and methods directed to providing support for the frog, and therefore the distal phalanx, of the affected animal.

II. Prior Art

Few horse owners will dispute the fact that one of the most debilitating conditions experienced by horses is laminitis. Equine laminitis is an intimation of the pedal laminae that form the supportive bond between the hoof and third phalanx. Although research has revealed that this condition may be caused by a number of seemingly diverse factors, from excessive intake of grain to physical stress, its harmful effects are well known to those who care for horses. Whether the condition is diagnosed as either acute or chronic laminitis, the more serious problems are related to ischemia and necrosis of the laminae.

In its acute phase, laminitis is characterized by the sudden onset of lameness. The front feet are most commonly affected, although the hind feet or all four feet are sometimes involved. When the front feet are affected, the horse will tend to shift its body weight to the hind limbs in an effort to reduce the pain associated with separation of the laminae. Understandably, the pain and the reluctance to walk can be associated with a variety of other signs, namely anorexia, depression, diarrhea, shock, and even death. In the chronic phase, laminitis is manifested by the ventral rotation and/or sinking of the distal phalanx from the hoof wall. The downward pressure created by the phalanx causes the sole of the foot to lose its concavity, resulting in bruising and possible penetration of the phalanx through the sole in extreme cases.

Due to the multisystemic nature of laminitis, the methods for treating it are quite varied. In the case of acute laminitis, mineral oil, a diet high in roughage, or a combination of both are recommended in order to prevent the further absorption of endotoxins, along with administration of non-steroidal anti-inflammatory drugs such as phenylbutazone. Also, aspirin may be administered to provide adequate anticoagulation, as well as dimethyl sulfoxide (DMSO) to restore peripheral circulation and control inflammation. In chronic laminitis, anti-hypertensive drugs may be administered concurrently with a high-roughage diet. Whether the condition is diagnosed as chronic or acute, however, the foregoing procedures would preferably be used in conjunction with some form of foot support, such as a sand surface or a rolled gauze pack underneath the frog of the foot.

Since foot support appears to satisfy a number of treatment goals, namely partial alleviation of pain, the slowing of further movement of the phalanx, and the prevention of recurrence, a number of interesting remedial devices and methods have been created. For example, one of the more common devices is known as the "heart bar shoe". This device looks similar to a conventional horse shoe, except for the addition of a V-shaped extension which supports the frog. Depending on the specific anatomical features of the affected foot and the extent of the laminitis, the apex of the V-shaped extension can be raised or lowered to provide more or less frog support. Another device used for frog support is known as the "Lilly pad", which fits onto the heel of the affected foot, but which also includes a V-shaped extension. Finally, others have suggested the use of soft, pliable material to provide resilient support for the frog.

Unfortunately, because much effort has been directed toward "custom-fit" support systems, the complexity of such systems has increased with variable success in the alleviation of pain from one animal to another. Each of the foregoing devices, with the exception of the "Lilly pad", can be applied only after careful scrutiny of the geometry of the affected foot, and most often require the services of an expert farrier to install. In fact, the improper preparation or use of these methods can actually aggravate the laminitis condition and cause greater pain for the affected animal. Most importantly, none of the above methods attempts to support both the frog and the collateral sulci. For reasons to be explained in more detail herein, simultaneous support for the frog and sulci is believed to be critical to effective pain management and overall minimization of the effects of laminitis. Therefore, while the above described methods may provide a certain level of pain relief and prevention of further deterioration of the laminae, there is still a need for a quick, inexpensive and effective frog support system.

SUMMARY OF THE INVENTION

Therefore, it is an object of this invention to provide an equine frog support system which reduces the pain associated with laminitis.

It is another object of this invention to provide an equine frog support system which helps in preventing the further severity of laminitis.

It is still another object of this invention to provide an equine frog support system which is simple, inexpensive, and easy to apply.

It is a further object of this invention to provide an equine frog support system which is customized for each foot affected by laminitis for maximum comfort and support.

It is another object of this invention to provide an equine frog support system which accomplishes various combinations of the above objects.

These and other objects and advantages of the present invention will no doubt become apparent to those skilled in the art after having read the following description of the embodiments which are contained in and illustrated by the various drawing figures.

Accordingly, an equine frog support system is provided, comprising a support base constructed of a material, preferably a thermoplastic material, molded to conform to the frog and collateral sulci of an equine foot, the material being sufficiently rigid and fully elastic during the use thereof to support the frog and the collateral sulci; and means for holding the support base against the foot. Preferably, the support base may be shaped to support only the frog and collateral sulci of the foot. Also, a method for treating equine laminitis is provided, comprising the steps of placing a softened hardenable material, preferably a thermoplastic material, over the frog and collateral sulci of an equine foot; while the material is in a softened state, causing the animal to place weight on the affected foot, thereby compressing the material between the ground and the foot; allowing the compressed material to conform to the frog and the collateral sulci until the material hardens, thereby forming a substantially rigid and fully elastic support base; and securing the support base to the foot. If necessary, the support base may be removed from the foot after the material hardens; and excess material may be removed from the support base so that primarily the frog and the collateral sulci are supported.

DETAILED DESCRIPTION OF THE PREFERRED EMBODIMENT

Figure 1:
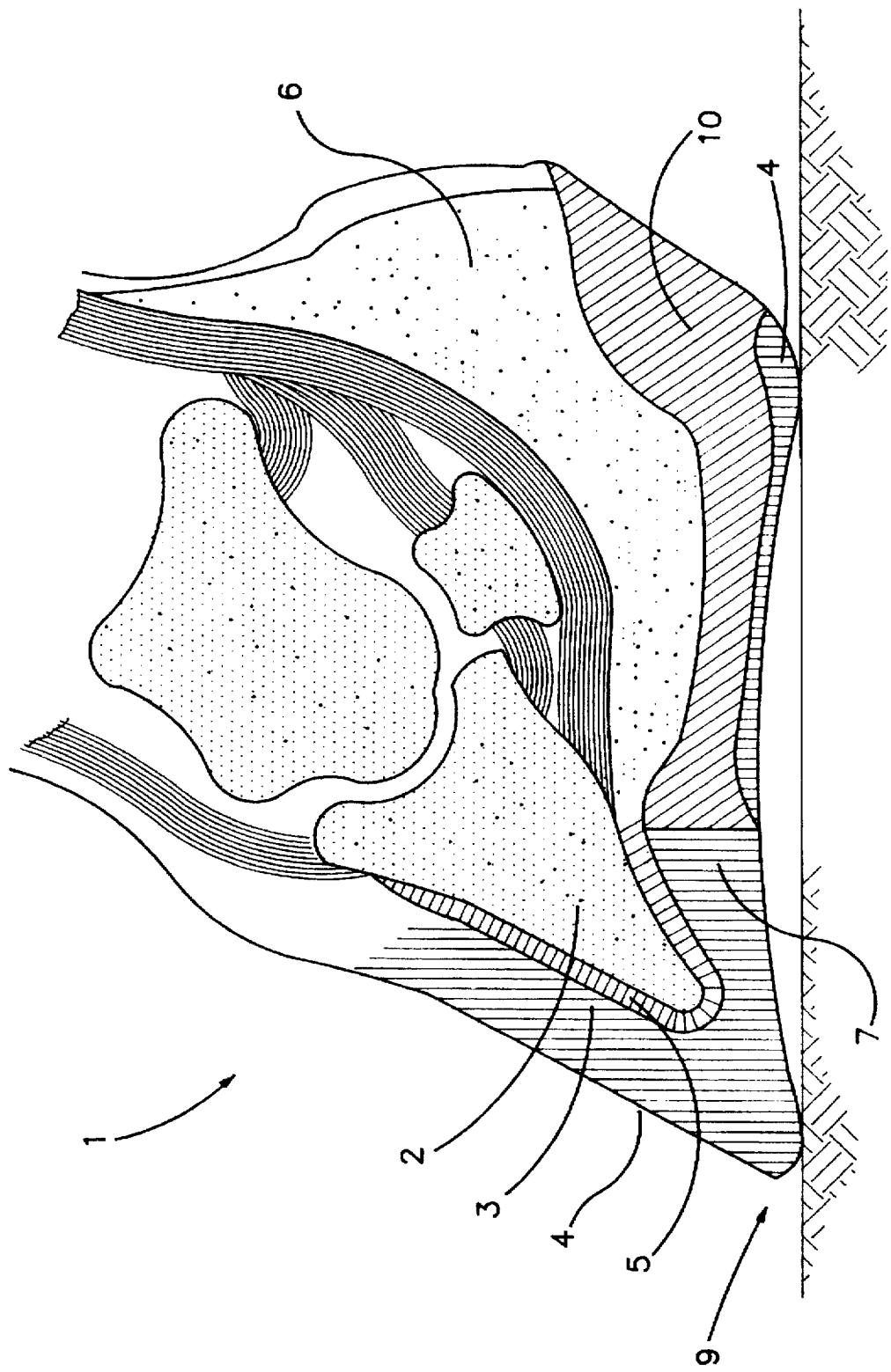
FIG. 1 is a saggital view of a normal equine foot depicting anatomical features important to the function of the present invention.
Figure 2:
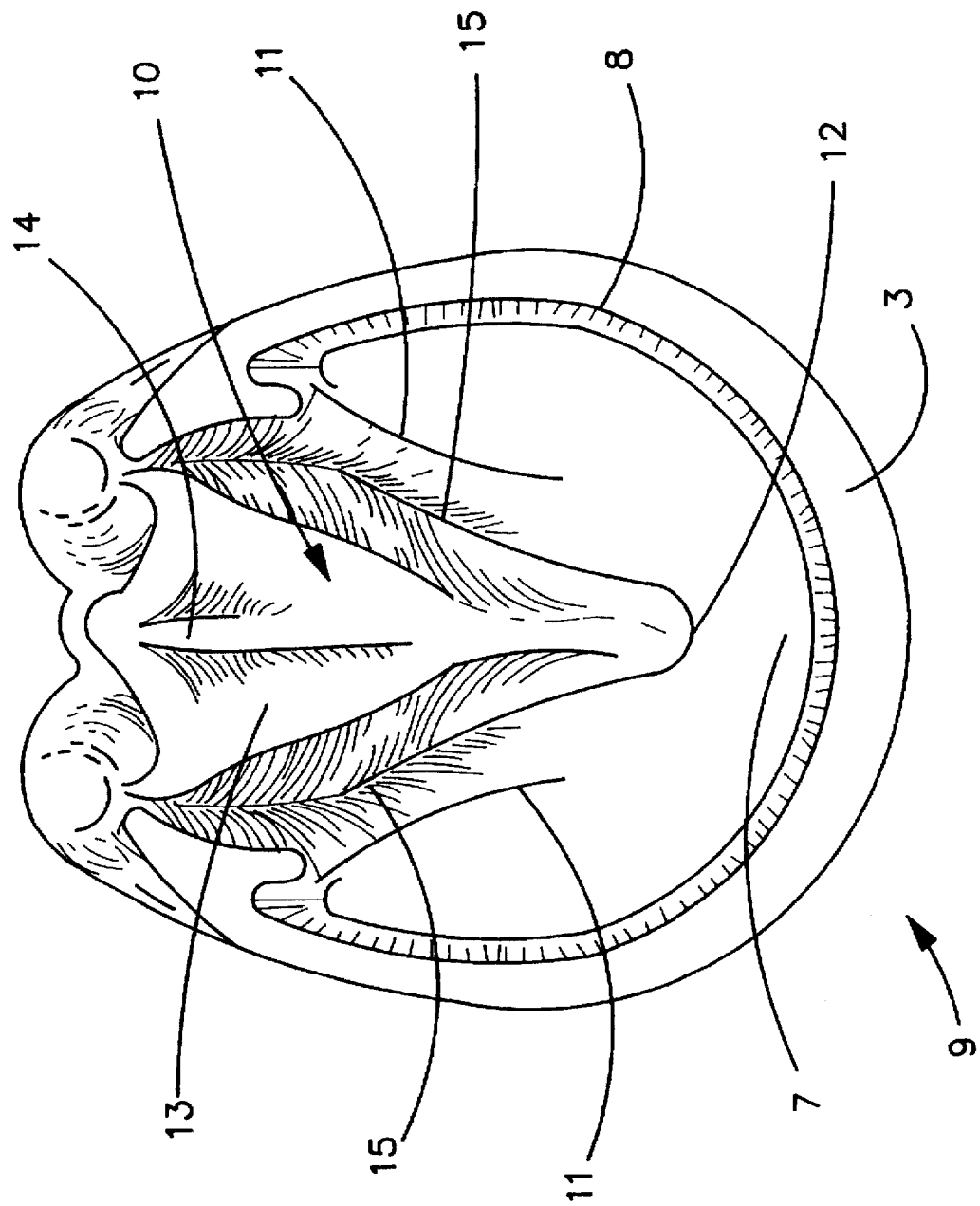
FIG. 2 is a bottom view of an equine foot depicting more of such features.
Figure 3:
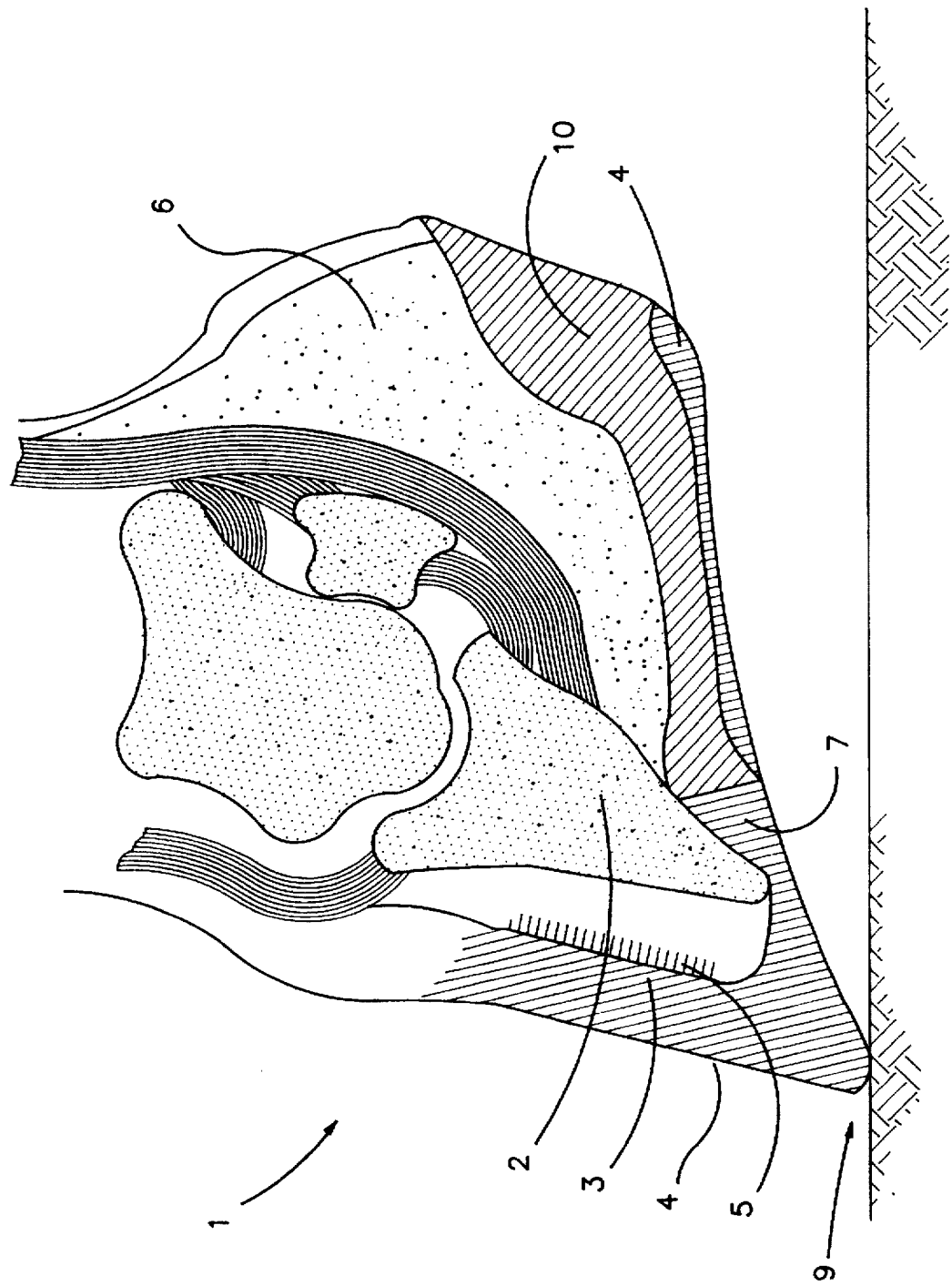
FIG. 3 is a saggital view of an equine foot affected by laminitis where the distal phalanx has rotated away from the hoof wall.

Turning now to the figures, a sectional view of a normal equine foot 1 is shown in FIG. 1, while a bottom view of the same foot is shown in FIG. 2. The third phalanx 2 is bounded by a combination of hard and soft tissue comprising the wall 3 of the hoof 4 and the laminae 5 on the dorsal side, with a digital cushion 6 extending from the heel to approximately the midpoint of the phalanx 2. The sole 7, which is slightly concave, covers the above internal features within the periphery of the white line 8 on the inside of the wall 3. Behind the me 9 lies the soft, wedge-shaped mass called the frog 10 that occupies the angles bounded by the bars 11 and the sole 7. The frog 10 may be further subdivided into the apex 12, the base 13 and the central sulcus 14. On each side of the frog 10 is a collateral sulcus 15, which is the recessed intersection of tissue between the sole 7 and the frog 10. As will be explained later herein, the present invention provides its advantages by the combined support of both the frog 10 and the collateral sulci 15.

In using the aforementioned prior art devices and methods, it was noted that none of the previous techniques involved complete support around the frog 10. Because the collateral sulci 15 are recessed into the foot, it was believed that support for these features might provide increased relief from pain. Thus, the only way to achieve full support is by a device which precisely conforms to the anatomical features of the foot. Therefore, the device and method of the present invention employ a fully elastic, thermoplastic material which can be molded in a softened state, attached to the foot of the affected animal, and hardened while being compressed by the weight of the animal to provide a custom fit. The term "fully elastic", as used herein, is defined as a condition in which the thermoplastic material undergoes substantially no plastic deformation at normal room temperatures and under the normal compressive stresses imposed upon the material by the animal during use.

Through experimentation, it has been found that a preferred thermoplastic material is one manufactured by Smith & Nephew Rolyan, Inc., of Menomenee, Wis., marketed under the trade name of Aquaplast™ and described in U.S. Pat. No. 4,240,415, which disclosure is incorporated herein by reference. This material is available in sheets of various thicknesses. Importantly, the Aquaplast™ material is also fully elastic when it is exposed to temperatures below about 140° F. In addition to being fully elastic in its hardened state, it possesses another characteristic referred to as "100% elastic memory" in the manufacturer's literature. This elastic memory allows the material to be molded to the desired form without loss of shape during the hardening period, and it allows the material to be repeatedly remolded as the need arises.

The inventive method disclosed herein comprises the following steps. First, a softened thermoplastic material is heated in water, in accordance with the manufacturer's instructions, to about 160°–180° F., at which point the material becomes pliable. The softened thermoplastic material is then folded into a block, after which the block of material is placed over the frog 10 and held in place by tape 17 or other equivalent wrapping around the foot 1. As will be understood to those of ordinary skill, the size of the block will depend upon the size of the frog 10 to be supported.

Figure 4:
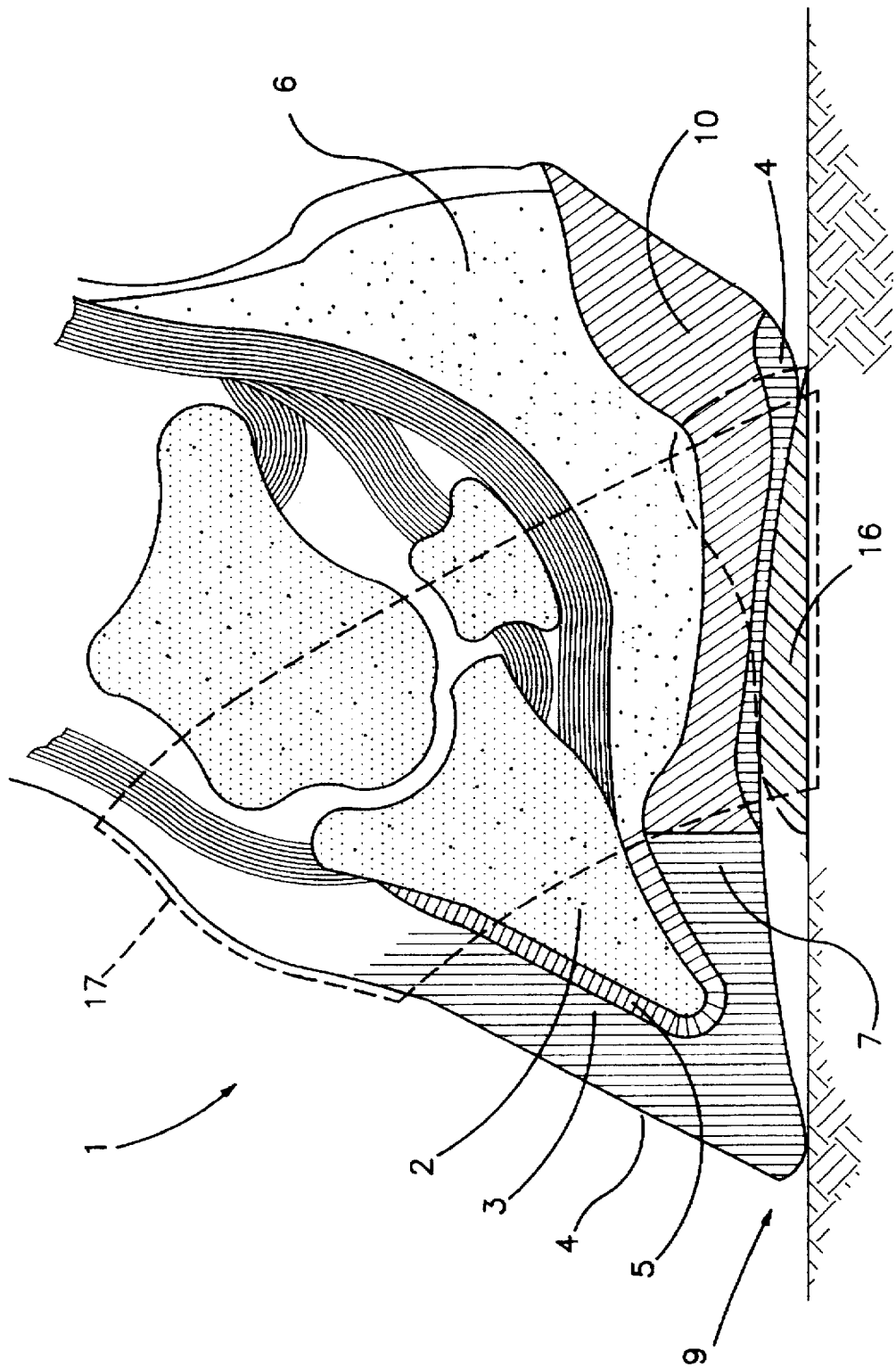
FIG. 4 is a side view of an equine foot with a preferred embodiment of the present invention applied to the foot.

Next, while the thermoplastic material is still in a softened state, the horse is caused to place weight on the affected foot 1 so that an accurate impression is made of the frog 10 and collateral sulci 15. In doing so, the desired relationship between the frog 10 and the ground is established, and the material is allowed to harden while in place. Thus, after hardening of the thermoplastic material, a substantially rigid support base 16 is created. As a part of this process, the support base 16 is finally secured to the affected foot 1 by tape 17 or other wrapping around the foot 1, as shown in FIG. 4.

In some cases, the pliability of the material will result in excess protuberances from the support base 16 which might adversely affect the intended support. For example, it is essential that the support base 16 be prevented from exerting excessive pressure on the sole 7, especially in the case of chronic laminitis where the phalanx 2 may be painfully rotated. Therefore, it is sometimes necessary to remove the support base 16 from the foot 1 so that such protuberances may be ground, cut away, or otherwise removed as needed. In this manner, the support base 16 is restricted to providing support primarily to the frog 10 and the collateral sulci 15.

Figure 5:
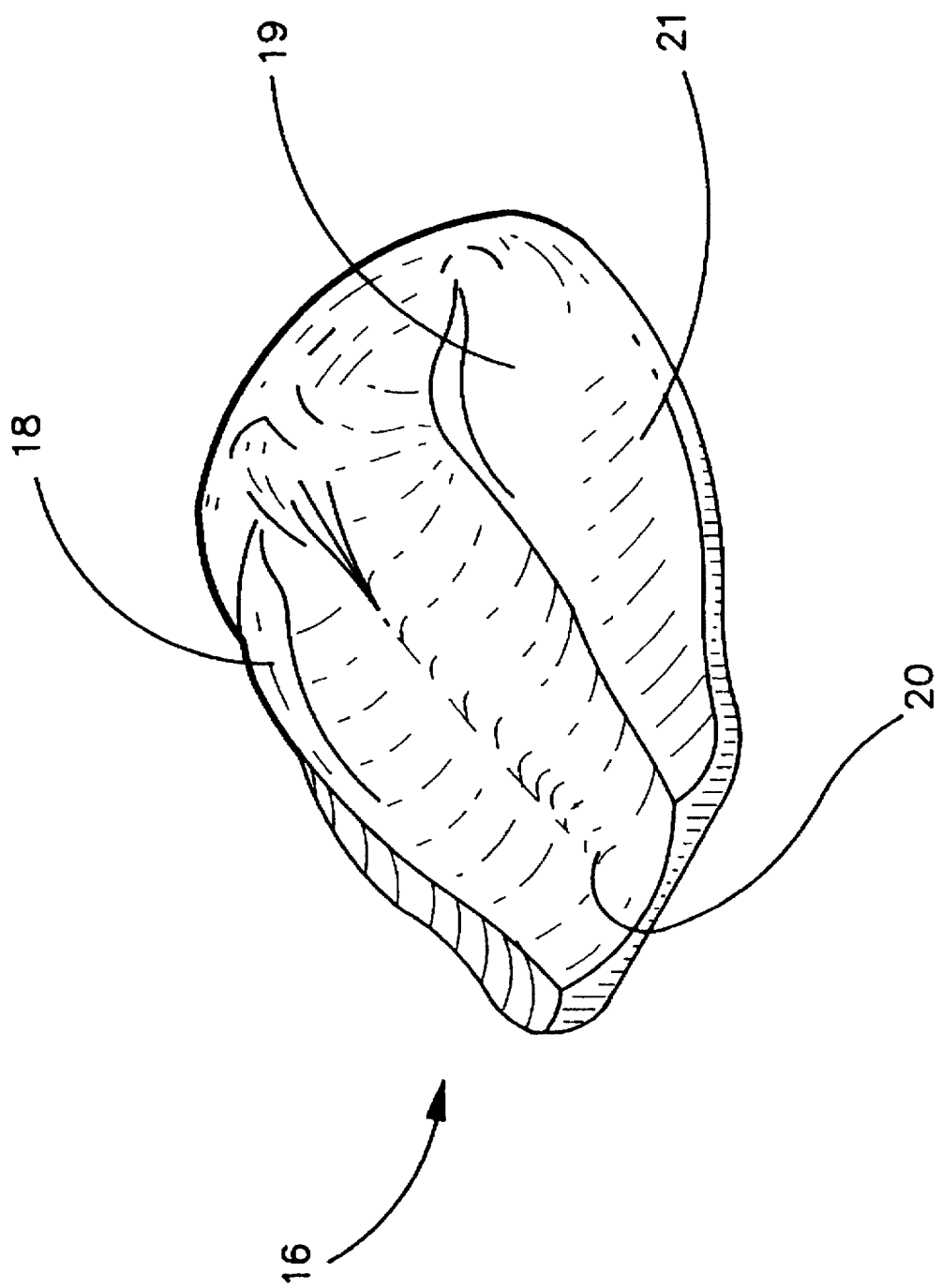
FIG. 5 is a perspective view of a typical frog support embodiment of the present invention.

FIG. 5 depicts a typical frog support base 16 of the present invention. Raised portions 18, 19 conform to the collateral sulci 15 of the foot 1 as explained earlier, while the depressed portion 20 corresponds to the impression made by the frog 10. Also as previously stated, the peripheral edge 21 of the support base 16 is formed to restrict support primarily to the frog 10 and collateral sulci 15, rather than to the sole 7.

It will be apparent to one of ordinary skill that the present invention has several advantages over prior methods. First, the entire frog 10 and collateral sulci 15 are fully supported, which is believed to provide a significant reduction in the pain associated with laminitis. In clinical trials conducted by the inventor, such reduction in pain has been confirmed by its correlation to the increase in weight that the animal places on the affected feet. Second, the decrease in pain should serve to facilitate healing of the laminitic condition by preventing further rotation of the phalanx 2, reducing stress, and otherwise allowing the animal to exercise and function more normally. Third, the custom nature of the support base 16 eliminates uncertainty over whether there is a proper fit against the unique anatomical features of each animal, and it ensures maximum comfort for the animal wearing the support base 16. In connection with this advantage, the fully elastic character of the hardened thermoplastic material maintains its custom shape despite the compressive forces applied to it during use by the animal. Unlike some prior methods and devices, the present invention is inexpensive to make and use, and it may be applied in a matter of minutes. Moreover, no special skills, such as those of a farrier, are required to practice the invention. If the medical needs of the affected animal require a newly shaped support base 16, the 100% elastic memory of the previously applied support base 16 allow it to be reheated to a softened, moldable state and reapplied to the foot in the manner described earlier herein.

Although the present invention has been described in terms of specific embodiments, it is anticipated that alterations and modifications thereof will no doubt become apparent to those skilled in the art. For example, it will be understood that a wide variety of thermoplastic materials may be used with substantially the same result. Likewise, other hardenable materials which do not necessarily rely on heat to establish moldability, such as various epoxy materials and elastomers, may also be equally suitable. It is therefore intended that the following claims be interpreted as covering all such alterations and modifications which fall within the true spirit and scope of the invention.

I claim:

1. An equine frog support system, comprising:
   (a) a support base constructed of a material molded to conform to the frog and collateral sulci of an equine foot, said material being sufficiently rigid during the use thereof to support the frog and the collateral sulci, and wherein said support base is shaped to support only the frog and collateral sulci of said foot; and
   (b) means for holding said support base against said foot.

2. The equine frog support system of claim 1, wherein said material is a thermoplastic material.

3. The equine frog support system of claim 2, wherein said material is fully elastic in its hardened state.

4. A method for treating equine laminitis, comprising the steps of:
   (a) placing a softened hardenable material over the frog and collateral sulci of an equine foot;
   (b) while said material is in a softened state, causing the animal to place weight on said foot, thereby compressing said material between the ground and said frog;
   (c) allowing said compressed material to conform to the frog and the collateral sulci until said material hardens, thereby forming a substantially rigid support base;
   (d) after said material hardens, removing excess material from said support base so that said support base supports only the frog and the collateral sulci; and
   (e) securing said support base to said foot.

5. The method of claim 4, wherein said hardenable material is a thermoplastic material.

6. The method of claim 5, wherein said material is fully elastic in its hardened state.

* * * * *